US009699868B2

(12) United States Patent
Morici et al.

(10) Patent No.: US 9,699,868 B2
(45) Date of Patent: Jul. 4, 2017

(54) SINGLE ISOLATION ELEMENT FOR MULTIPLE INTERFACE STANDARDS

(71) Applicant: Infineon Technologies Austria AG, Villach (AT)

(72) Inventors: Andrea Morici, Munich (DE); Kurt Marquardt, Munich (DE)

(73) Assignee: Infineon Technologies Austria AG, Villach (AT)

( * ) Notice: Subject to any disclaimer, the term of this patent is extended or adjusted under 35 U.S.C. 154(b) by 67 days.

(21) Appl. No.: 14/675,139

(22) Filed: Mar. 31, 2015

(65) Prior Publication Data

US 2016/0295673 A1 Oct. 6, 2016

(51) Int. Cl.
*H04L 25/00* (2006.01)
*H05B 37/02* (2006.01)

(52) U.S. Cl.
CPC ................................ *H05B 37/0245* (2013.01)

(58) Field of Classification Search
CPC ...................... H04L 12/10; H04L 2012/40208
USPC .......................................................... 375/258
See application file for complete search history.

(56) References Cited

U.S. PATENT DOCUMENTS 3,488,517 A 1/1970 Cowan et al.
5,068,576 A 11/1991 Hu et al.
6,166,567 A * 12/2000 McCullough ........ G11C 27/024 327/100
7,009,348 B2 * 3/2006 Mogilner ........... H05B 37/0263 315/209 R
7,573,372 B2 * 8/2009 Mogilner ........... H05B 37/0263 315/318
8,036,321 B2 * 10/2011 Mogilner ........... H05B 37/0263 375/130
8,208,577 B2 * 6/2012 Calvin ................... G01D 21/00 375/257
8,427,074 B1 4/2013 Xiong et al.
8,514,964 B2 * 8/2013 Calvin ................... G01D 21/00 375/272
2004/0153543 A1 * 8/2004 Thomas .................... G06F 1/26 709/225
2008/0181316 A1 * 7/2008 Crawley ................. H04L 12/10 375/258

(Continued)

FOREIGN PATENT DOCUMENTS

DE 102012224515 A1 7/2014

OTHER PUBLICATIONS

"Digital Addressable Lighting Interface (DALI) Control Devices Protocol," Part 1-2004, General Requirements, NEMA Standards Publication 234-2004, Version 1.13, Oct. 29, 2004, 122 pp.

(Continued)

*Primary Examiner* — Thuy Vinh Tran
(74) *Attorney, Agent, or Firm* — Shumaker & Sieffert, P.A.

(57) ABSTRACT

In one example, a device includes a transformer configured to electrically isolate one or more components of the device from a communication bus, and a controller configured to receive and transmit data via the communication bus, wherein the controller is operable to communicate via a plurality of communication standards that include at least one analog unidirectional communication standard and at least one digital bidirectional communication standard, and wherein both the received data and the transmitted data pass through the transformer.

19 Claims, 7 Drawing Sheets

(56) References Cited

U.S. PATENT DOCUMENTS

| | | | | |
|---|---|---|---|---|
| 2015/0108912 A1* | 4/2015 | Tikkanen | H05B 33/0803 315/201 |
| 2015/0236759 A1* | 8/2015 | Cornell | H04B 5/0093 375/256 |

OTHER PUBLICATIONS

"Digital Addressable Lighting Interface (DALI) Control Devices Protocol," Part 2-2004, Specific Commands for Control Devices, NEMA Standards Publication 234-2004, Version 1.3, Oct. 29, 2004, 32 pp.

Office Action, in the German language, from counterpart German Application No. 102016105739.8, dated Nov. 9, 2016, 10 pp.

* cited by examiner

SINGLE ISOLATION ELEMENT FOR MULTIPLE INTERFACE STANDARDS

TECHNICAL FIELD

This disclosure relates to communicating over isolated interfaces.

BACKGROUND

As lighting applications become more sophisticated, it may be desirable to integrate more advanced features into lighting systems. For instance, it may be desirable to integrate digital communication interfaces and light emitting diode (LED) technology into lighting systems. When integrating such advanced features, it may be desirable to maintain safety aspects of the lighting systems. For instance, it may be desirable to include isolation barriers between users/servicers of the systems and high voltages, such as AC mains.

Additionally, it may be desirable to control different lighting systems using different communication standards. As one example, it may be desirable to control some lighting systems using analog communication standards, such as the 0-10V dimming standard. As another example, it may be desirable to control some lighting systems using digital communication standards, such as DALI (Digital Addressable Lighting Interface) or DMX (e.g., DMX512).

SUMMARY

In general, this disclosure is directed to devices that include a single isolation element to electrically isolate one or more components of the devices from a communication bus. For example, a device may include a controller configured to receive data from and transmit data to a communication bus such that both the received data and the transmitted data pass through the same isolation element.

In one example, a method includes receiving, by a controller of a device from a communication bus and via a transformer of the device that is configured to electrically isolate one or more components of the device from a communication bus, data of a digital bidirectional communication standard; and transmitting, by the controller to the communication bus and via the transformer, data of the digital bidirectional communication standard, wherein the controller is further configured to receive, from the communication bus and via the transformer, data of an analog unidirectional communication standard.

In another example, a device includes a transformer configured to electrically isolate one or more components of the device from a communication bus; and a controller configured to receive data and transmit data via the communication bus, wherein the controller is operable to communicate via a plurality of communication standards that include at least one analog unidirectional communication standard and at least one digital bidirectional communication standard, and wherein both the received data and the transmitted data pass through the transformer.

In another example, a device includes means for electrically isolating one or more components of the device from a communication bus; and means for receiving data and transmitting data via the communication bus, wherein the means for receiving data and transmitting data are operable to communicate via a plurality of communication standards that include at least one analog unidirectional communication standard and at least one digital bidirectional communication standard, and wherein both the received data and the transmitted data pass through the means for electrically isolating.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to devices that include a single isolation element to electrically isolate one or more components of the devices from a communication bus. For example, a device may include a controller configured to receive data from and transmit data to a communication bus such that both the received data and the transmitted data pass through the same isolation element.

In some examples, it may be desirable for a device to communicate via a plurality of communication standards. For instance, in order to be compatible with a wide variety of systems, it may be desirable for a single device to be able to communicate via a plurality of communication standards. However, integrating separate components for each communication standard into a device may increase the bill of materials (BOM), cost, and/or complexity of the device. For instance, using separate isolation elements to transmit and receive signals may increase the size, cost, and/or BOM of a device.

In accordance with one or more techniques of this disclosure, as opposed to using separate isolation elements, a device may include a communication interface that is operable to transmit and receive signals for a plurality of communication standards using a single isolation element. For instance, a lighting device may include a communication interface that is operable to receive signals for the 0-10V dimming standard, the DALI standard and/or the DMX standard using a single isolation element. The communication interface may also be operable to transmit signals for the DALI standard and/or bidirectional implementations of the DMX standard (e.g., Remote Device Management) using the same single isolation element. In this way, the cost and/or complexity of a lighting device that is compatible with multiple communication standards may be reduced.

Figure 1:
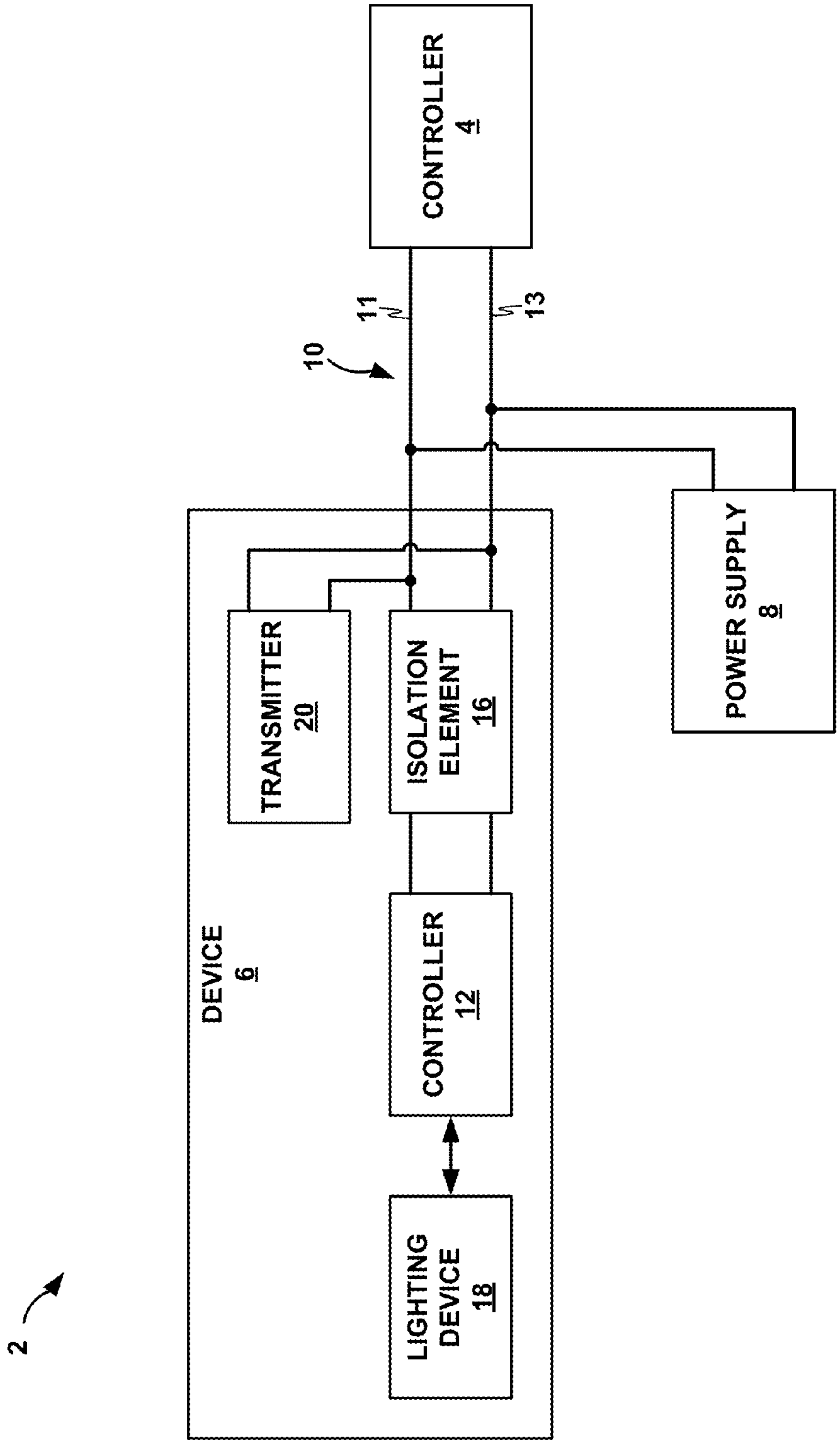
FIG. 1 is a conceptual diagram illustrating an example system that includes a device controlled by an external controller via a communication bus, in accordance with one or more exemplary techniques of this disclosure.

FIG. 1 is a conceptual diagram illustrating an example system that includes a device controlled by an external controller via a communication bus, in accordance with one or more exemplary techniques of this disclosure. As illustrated in FIG. 1, system 2 may include controller 4, device 6, and power supply 8, each of which may be connected to communication bus 10.

In some examples, system 2 may include controller 4, which may be configured to control the operation of device 6. For instance, controller 4 may cause device 6 to turn on, turn off, dim, change color, or any perform any number of other operations to a lighting device, such as lighting device 18. In some examples, controller 4 may control operation of device 6 by communicating with device 6 via communication bus 10. For instance, controller 4 may output signals to device 6 via communication bus 10 that cause device 6 to perform one or more operations.

In some examples, system 2 may include power supply 8, which may be configured to provide power to one or more components of system 2. For instance, power supply 8 may provide power to controller 4, device 6, and/or communication bus 10. In some examples, power supply 8 may provide the power by biasing communication bus 10 with a voltage signal (e.g., 5 volts, 10, volts, 14 volts, 20 volts, etc.). For instance, where communication bus 10 is a DALI communication bus, power supply 8 may bias Bus+ to Bus− with 14 volts. In some examples, such as the example of FIG. 1, power supply 8 may be a discrete component. In some examples, power supply 8 may be integrated into another component of system 2, such as controller 4. In some examples, such as where communication bus 10 is a 0-10 V communication bus, power supply 8 may be omitted from system 2.

In some examples, system 2 may include communication bus 10, which may be configured to enable communication between components of system 2. For instance, communication bus 10 may enable communication between controller 4 and device 6. In some examples, communication bus 10 may include a plurality of leads. For instance, as illustrated in FIG. 1, communication bus 10 may include first lead 11 and second lead 13. In some examples, such as where communication bus 10 is a DALI communication bus, first lead 11 may be referred to as "Bus +" and second lead 13 may be referred to as "Bus −". In some examples, such as where communication bus 10 is a DMX communication bus, first lead 11 may be referred to as either "Data 1+" or "Data 1−" and second lead 13 may be ground. In such examples, communication bus 10 may include an additional lead which may be whichever of "Data 1+" or "Data 1−" that does not correspond to first lead 11.

In some examples, system 2 may include device 6, which may be configured to perform one or more operations at the direction of controller 4. For instance, where device 6 includes or attached to a lighting device, such as lighting device 18, device 6 may activate (turn on), deactivate (turn off), dim (adjust brightness), change a color, and/or change a position (pitch, roll, yaw) of the lighting device. As illustrated in FIG. 1, device 6 may include controller 12, communication interface 14, lighting device 18, and transmitter 20.

Device 6, in some examples, may include controller 12, which may be configured to perform one or more operations to control lighting device 18. For instance, controller 12 may activate (turn on), deactivate (turn off), dim (adjust brightness), change a color, and/or change a position (pitch, roll, yaw) of lighting device 18. In some examples, controller 12 may control the operation of lighting device 18 based on signals received from one or more external devices via communication bus 10. For instance, controller 12 may dim a level of lighting device 18 based on a signal received from controller 4 via communication bus 10.

In some examples, controller 12 may be configured to communicate with one or more external devices, such as controller 4. In some examples, controller 12 may be operable to enable communication via a plurality of communication standards. For instance, controller 12 may be operable to enable communication via at least one unidirectional communication standard (e.g., the 0-10 V communication standard and/or some implementations of the DMX communication standard) and at least one bidirectional communication standard (e.g., the DALI communication standard and/or some implementations of the DMX communication standard). In some examples, controller 12 may operate in a plurality of communication states. For instance, controller 12 may operate in a transmit communication state in which controller 12 may transmit data via communication bus 10, a receive communication state in which controller 12 may receive data via communication bus 10, and an idle state in which controller 12 does not communicate via communication bus 10. In some examples, controller 12 may be configured to operate in the idle state when unpowered so as to not interfere with communication via communication bus 10.

Device 6, in some examples, may include isolation element 16, which may be configured to electrically isolate one or more components of device 6 from communication bus 10. For instance, isolation element 16 which may be configured to electrically isolate controller 12 from communication bus 10. In this way, isolation element 16 may prevent overvoltage conditions on communication bus 10 from damaging components of device 6. Also in this way, isolation element 16 may prevent overvoltage conditions from propagating from device 6 to communication bus 10. Examples of isolation element 16 include transformers, opto-couplers, or any other element capable of enabling galvanic isolation.

Device 6, in some examples, may include transmitter 20, which may be configured to transmit signals to one or more other components of system 2, such as controller 4. In some examples, transmitter 20 may transmit signals to one or more other components of system 2 in response to receiving a signal from controller 12. As illustrated in FIG. 1, transmitter 20 may be electrically positioned between isolation element 16 and communication bus 10.

In accordance with one or more techniques of this disclosure, as opposed to including separate isolation elements for each of communication standards or separate isolation elements to transmit and receive signals, device 6 may include a single isolation element 16 such that both the received signals and the transmitted signals pass through isolation element 16. In this way, device 6 may be operable to communicate using a plurality of communication standards using a single isolation element.

Device 6, in some examples, may include lighting device 18, which may be configured to output light under the direction of controller 12. Examples of lighting device 18 include, but are not limited to, light emitting diodes (LEDs), incandescent lights, florescent lights, arc-lights, high-intensity discharge lamps, lasers, or any other type light source.

In operation, where communication bus 10 operates as an analog communication bus, such as 0-10 V analog communication bus, controller 4 may control device 6 by adjusting the voltage across first lead 11 and second lead 13. As one example, to cause controller 12 to deactivate lighting device 18, controller 4 may cause the voltage across first lead 11 and second lead 13 to be zero. As another example, to cause controller 12 to activate lighting device 18 with approximately half power, controller 4 may cause the voltage across first lead 11 and second lead 13 to be five. As another example, to cause controller 12 to activate lighting device 18 with full power, controller 4 may cause the voltage across first lead 11 and second lead 13 to be ten.

Controller 12 may control lighting device 18 based on the voltage across first lead 11 and second lead 13. In some examples, such as where isolation element 16 is a transformer, the DC voltage signal generated by controller 4 may not pass through the transformer unless the transformer is magnetized. As such, in order to receive signals from communication bus 10, controller 12 operate in the receive communication state by outputting a signal to magnetize the transformer. Once magnetized, the signal may pass through the transformer and an analog-to-digital converter of controller 12 may convert the voltage level into a digital value. Controller 12 may then control lighting device 18 based on the digital value. In this way, controller 12 may receive signals using an analog communication standard.

Where communication bus 10 operates as a digital communication bus, such as a DALI communication bus, controller 4 may control device 6 by sending digital signals to control device 6, such as by modulating the voltage across first lead 11 and second lead 13. In some examples, controller 4 may encode a logic low (i.e., "0") by causing the voltage level across first lead 11 and second lead 13 to be low (e.g., −6.5 volts to 6.5 volts) and encode a logic high (i.e., "1") by causing the voltage level across first lead 11 and second lead 13 to be high (e.g., 9.5 volts to 22.5 volts). In some examples, such as where power supply 8 supplies a high voltage level (e.g., 9.5 volts to 22.5 volts) across first lead 11 and second lead 13, controller 4 may encode a logic low by shorting first lead 11 and second lead 13 and encode a logic high by releasing first lead 11 from second lead 13 such that power supply 8 returns the voltage level to the high voltage level.

Controller 12 may control lighting device 18 based on the digital signals received from controller 4. In some examples, such as where isolation element 16 is a transformer, the DC voltage signals generated by controller 4 may not pass through the transformer unless the transformer is magnetized. As such, in order to receive digital signals from communication bus 10, controller 12 may operate in the receive communication state by outputting a signal to magnetize the transformer. Once magnetized, the signals may pass through the transformer and an analog-to-digital converter of controller 12 may convert the voltage levels into logical values. Controller 12 may then control lighting device 18 based on the logical values. In this way, controller 12 may receive signals using a digital communication standard.

As discussed above, in some examples, controllers 4 and 12 may be capable of communicating using a bidirectional communication standard. In a bidirectional communication standard, controller 12 may receive signals as described above. To transmit signals, controller 12 may encode logical high and logical low levels on communication bus 10. For instance, where isolation element 16 is a transformer, controller 12 may operate in the transmit communication state by magnetizing the transformer such that transmitter 20 shorts first lead 11 and second lead 13. In some examples, to transmit signals, controller 12 may magnetize isolation element 16 differently than to receive signals. As one example, controller 12 may magnetize isolation element 16 at a first frequency to transmit signals and magnetize isolation element 16 at a second frequency to receive signals. In such examples, transmitter 20 may be configured to short first lead 11 to second lead 13 in response to isolation element 16 being magnetized at the first frequency. As another example, controller 12 may magnetize isolation element 16 at a first duty cycle to transmit signals and magnetize isolation element 16 at a second duty cycle to receive signals. In such examples, transmitter 20 may be configured to short first lead 11 to second lead 13 in response to isolation element 16 being magnetized at the first duty cycle.

Figure 2:
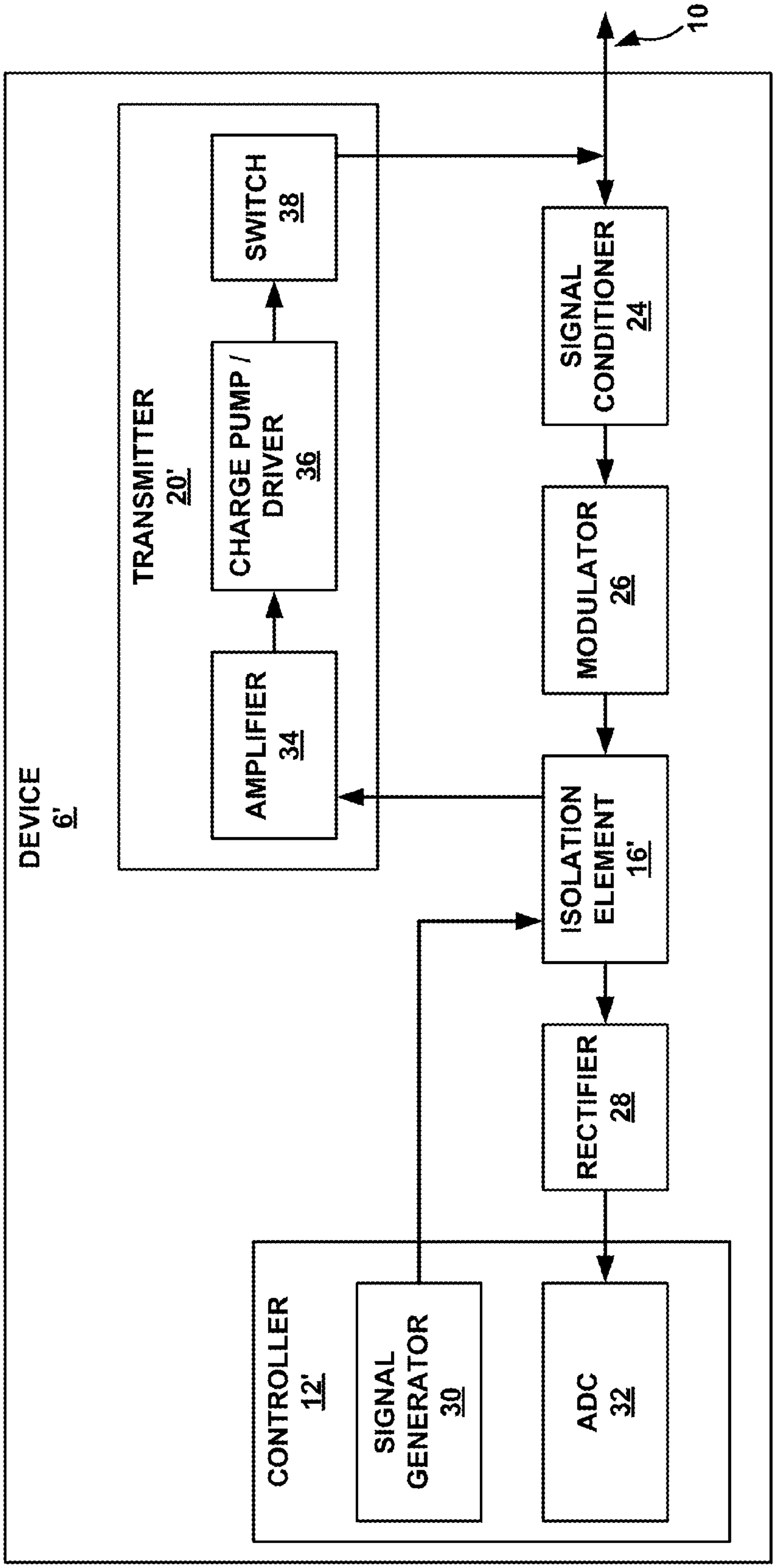
FIG. 2 is a conceptual diagram illustrating further details of an example of a device configured to transmit and receive signals via a communication bus using a single isolation element, in accordance with one or more techniques of this disclosure.

FIG. 2 is a conceptual diagram illustrating the signal flow through and further details of one example of device 6 of FIG. 1 that is configured to transmit and receive signals via a communication bus using a single isolation element, in accordance with one or more techniques of this disclosure. As illustrated in FIG. 2, device 6' may include controller 12', isolation element 16', transmitter 20', signal conditioner 24, modulator 26, and rectifier 28.

In some examples, device 6' may include controller 12', which may be configured to perform operations similar to controller 12 of FIG. 1. For instance, controller 12 may be configured to communicate with one or more external devices and perform one or more operations to control a device, such as lighting device 18. As illustrated in FIG. 2, controller 12' may include signal generator 30 and analog-to-digital converter (ADC) 32.

Controller 12, in some examples, may include signal generator 30, which may be configured to generate a signal to cause isolation element 16' to pass signals. For instance, where isolation element 32 includes a transformer, signal generator 30 may generate a pulse-width modulation (PWM) signal to magnetize the transformer. In some examples, signal generator 30 may generate different signals when device 6' is transmitting signals as opposed to when device 6' is receiving data. As one example, signal generator 30 may generate a first PWM signal at a first frequency (e.g., 200 kilohertz) to enable device 6' to transmit data and a second PWM signal at a second frequency (e.g., 50 kilohertz) to enable device 6' to receive data. As another example, signal generator 30 may generate a first PWM signal at a first duty cycle to enable device 6' to transmit data and a second PWM signal at a second duty cycle to enable device 6' to receive data.

Controller 12', in some examples, may include ADC 32, which may be configured to convert an analog voltage level into a digital value. For instance, ADC 32 may convert analog voltage levels received from rectifier 28 into digital voltage values. In some examples, controller 12' may control a device, such as lighting device 18 of FIG. 1, based on the digital voltage values.

In some examples, may include isolation element 16', which may be configured to perform operations similar to isolation element 16 of FIG. 1. For instance, isolation element 16' may be configured to electrically isolate controller 12' from communication bus 10. In this way, isolation element 16' may prevent overvoltage conditions on communication bus 10 from damaging components of device 6'. Also in this way, isolation element 16 may prevent overvoltage conditions from propagating from device 6' to communication bus 10. Examples of isolation element 16' include transformers, opto-couplers, or any other element capable of enabling galvanic isolation.

In some examples, device 6' may include signal conditioner 24, which may be configured to condition signals received via communication bus 10. In some examples, signal conditioner 24 may condition the received signals by adjusting a voltage level of the signals.

In some examples, device 6' may include modulator 26, which may be configured to modulate a signal of isolation element 16' based on the received signals. For instance, where isolation element 16 includes a transformer, modulator 26 may include a transistor configured to modulate the transformer signal.

In some examples, device 6' may include rectifier 28, which may be configured to rectify a signal. For instance, where isolation element 16' includes a transformer and a signal of the transformer is modulated by modulator 26, rectifier 28 may rectify the transformer signal, which is an AC signal, into a DC signal which may be read by an analog-to-digital converter, such as ADC 32 of controller 12'.

In some examples, device 6' may include transmitter 20', which may be configured to perform operations similar to transmitter 20 of FIG. 1. For instance, transmitter 20' may be configured to transmit signals to one or more other components, such as controller 4 of FIG. 1. As illustrated in FIG. 2, transmitter 20' may include amplifier 34, charge pump/driver (CPD) 36, and switch 38. In some examples, transmitter 20' may further include a voltage regulator configured to generate a power signal for transmitter 20' using power received from communication bus 10.

Transmitter 20, in some examples, may include amplifier 34, which may be configured to amplify a signal. For instance, amplifier 34 may amplify a signal of isolation element 16' and output the amplified signal to CDP 36. In some examples, amplifier 34 may be configured to amplify certain signals more than others. For instance, amplifier 34 may be configured to amplify signals with a first frequency, such as the frequency of the signal generated by signal generator 30 to magnetize isolation element 16' when transmitting signals via communication bus 10, more than signals with a second frequency, such as the frequency of the signal generated by signal generator 30 to magnetize isolation element 16' when receiving communication bus 10. Further details of amplifier 34 are discussed below with reference to FIG. 3.

Transmitter 20', in some examples, may include CPD 36, which may be configured to generate a signal to drive a switch, such as switch 38. Further details of CPD 36 are discussed below with reference to FIG. 3.

Transmitter 20', in some examples, may include switch 38, which may be configured to output a signal via communication bus 10. For instance, switch 38 may be configured to short two leads of communication bus 10. Further details of switch 38 are discussed below with reference to FIG. 3.

In operation and as illustrated by FIG. 2, signal conditioner 24 may receive signals from communication bus 10, and output the conditioned received signals to modulator 26, which may modulate isolation element 16' based on the received signals. In order for the signals to pass through isolation element 16', signal generator 30 may generate a signal to magnetize isolation element 16'. The modulated received signals may pass through magnetized isolation element 16' to rectifier 28, which may rectify the modulated received signals to generate rectified received signals, which may be converted into digital values by ADC 32.

To transmit signals, signal generator 30 may generate a signal to magnetize isolation element 16'. As discussed above, the signal generated by signal generator 30 when transmitting may be different than when receiving (e.g., different frequencies, different duty cycles, etc.). Transmitter 20' may output signals based on the signals generated by signal generator 30. As one example, when signal generator 30 magnetizes isolation element 16' at a first frequency, transmitter 20 may lower a voltage drop across two leads of communication bus 10. As another example, when signal generator 30 does not magnetize isolation element 16' at the first frequency, transmitter 20' may not alter the voltage drop across the two leads of communication bus 10. In this way, device 6' may transmit two different logical symbols.

Figure 3:
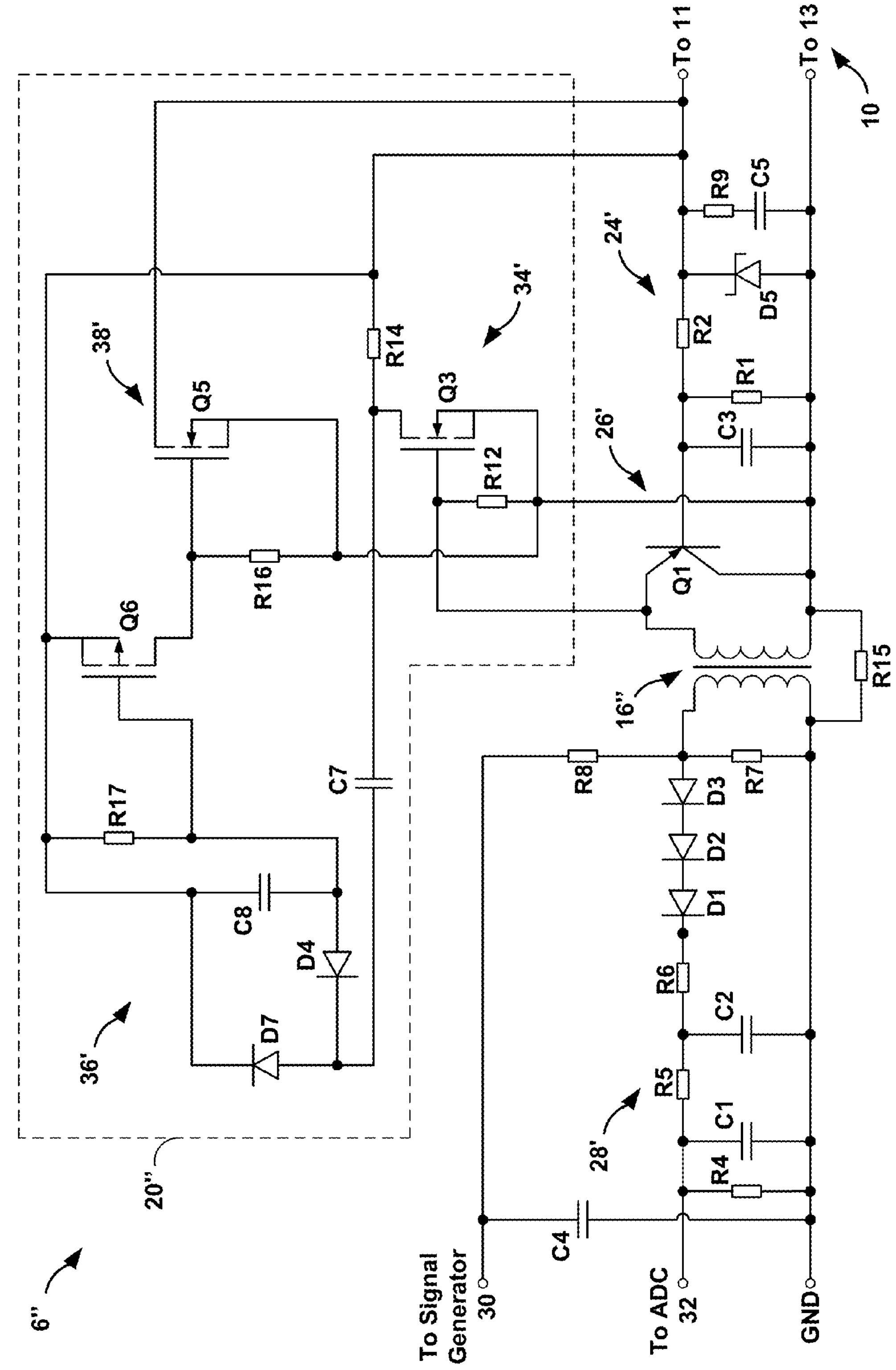
FIG. 3 is a schematic diagram illustrating further details of device 6 of FIGS. 1 and 2 that is configured to transmit and receive signals via a communication bus using a single isolation element, in accordance with one or more techniques of this disclosure.

FIG. 3 is a schematic diagram illustrating further details of components of device 6' of FIG. 2 that is configured to transmit and receive signals via a communication bus using a single isolation element, in accordance with one or more techniques of this disclosure. As illustrated in FIG. 3, device 6" may include isolation element 16, transmitter 20, signal conditioner 24, modulator 26, and rectifier 28. While not illustrated in FIG. 3, device 6" may also include a controller, such as controller 12' of FIG. 2 that includes signal generator 30 and ADC 32.

Device 6" may include transmitter 20", which may be configured to perform operations similar to transmitter 20' of FIG. 2. For instance, transmitter 20 may be configured to transmit signals to one or more other components, such as controller 4 of FIG. 1. As illustrated in FIG. 3, transmitter 20" may include amplifier 34', CPD 36', and switch 38'. In some examples, transmitter 20" may further include a voltage regulator configured to generate a power signal for transmitter 20" using power received from communication bus 10. In this way, the voltage regulator may power transmitter 20" using a power signal that is decoupled from communication bus 10.

Transmitter 20", in some examples, may include amplifier 34', which may be configured to perform operations similar to amplifier 34 of FIG. 2. For instance, amplifier 34' may be configured to amplify a signal. As illustrated in FIG. 3, amplifier 34' may include components R12, Q3, and R14. In some examples, R12 may be a resistor (e.g., a 17 k ohm resistor), R14 may be a resistor (e.g., a 22 k ohm resistor), and Q3 may be a transistor (e.g., a BST72A transistor).

Transmitter 20", in some examples, may include CPD 36', which may be configured to perform operations similar to CPD 36 of FIG. 2. For instance, CPD 36' may be configured to generate a signal to drive a switch, such as switch 38'. As illustrated in FIG. 3, CPD 36' may include components C7, C8, D4, D7, R16, R17, and Q6. In some examples, R16 may be a resistor (e.g., a 17 k ohm resistor), R17 may be a resistor (e.g., a 200 k ohm resistor), C7 may be a capacitor (e.g., a 1.8 pico-farad capacitor), C8 may be a capacitor (e.g., 500 pico-farad capacitor), D4 and D7 may be diodes (e.g., D1n4148 diodes), and Q6 may be a transistor (e.g., a BSH203 transistor).

Transmitter 20, in some examples, may include switch 38', which may be configured to perform operations similar to switch 38 of FIG. 2. For instance, switch 38' may be configured to output a signal via communication bus 10. As illustrated in FIG. 3, switch 38' may include component Q5. In some examples, Q5 may be a transistor (e.g., a PMG370XN transistor).

In some examples, device 6" may include signal conditioner 24', which may be configured to perform operations similar to signal conditioner 24 of FIG. 2. For instance, signal conditioner 24 may be configured to condition signals received via communication bus 10. As illustrated in FIG. 3, signal conditioner 24' may include components R1, R2, R9, C3, C5, and D5. In some examples, R1 may be a resistor (e.g., a 6 k ohm resistor), R2 may be a resistor (e.g., a 15 k ohm resistor), R9 may be resistor (e.g. a 39 k ohm resistor), C3 and C5 may be capacitors (e.g., 10 pico-farad capacitors), and D5 may be a diode (e.g., a BZD23-16 diode)

In some examples, device 6" may include modulator 26', which may be configured to perform operations similar to modulator 26 of FIG. 2. For instance, modulator 26' may be configured to modulate a signal of isolation element 16" based on the received signals. As illustrated in FIG. 3, modulator 26' may include Q1. In some examples, Q1 may be a transistor (e.g., a BCV46/PS transistor).

In some examples, device 6" may include isolation element 16", which may be configured to perform operations similar to isolation element 16' of FIG. 2. For instance, isolation element 16" may be configured to electrically isolate one or more components of device 6" from communication bus 10. In this way, isolation element 16" may prevent overvoltage conditions on communication bus 10 from damaging components of device 6". As illustrated in FIG. 3, isolation element 16" may be a transformer.

In some examples, device 6" may include rectifier 28', which may be configured to perform operations similar to rectifier 28 of FIG. 2. For instance, rectifier 28' may be configured to rectify a signal. As illustrated in FIG. 3, rectifier 28' may include D1, D2, D3, C1, C2, R4, R5, R6, and R7. In some examples, D1-D3 may be diodes (e.g., D1n4148 diodes), C1 may be a capacitor (e.g., a 1 nano-farad capacitor), C2 may be a capacitor (e.g., a 500 pico-farad capacitor), R4 may be a resistor (e.g., a 43.2 k ohm resistor), R5 may be a resistor (e.g., a 5 k ohm resistor), R6 may be a resistor (e.g., a 1.5 k ohm resistor), and R7 may be a resistor (e.g., a 68 k ohm resistor).

In addition to the components discussed above, as illustrated in FIG. 3, device 6 may include C4, R8, and R15. In some examples, C4 may be a capacitor (e.g., a 220 pico-farad capacitor), R8 may be a resistor (e.g., a 2.2 k ohm resistor), and R15 may be a resistor (e.g., a 10 mega-ohm resistor).

Figure 4A:
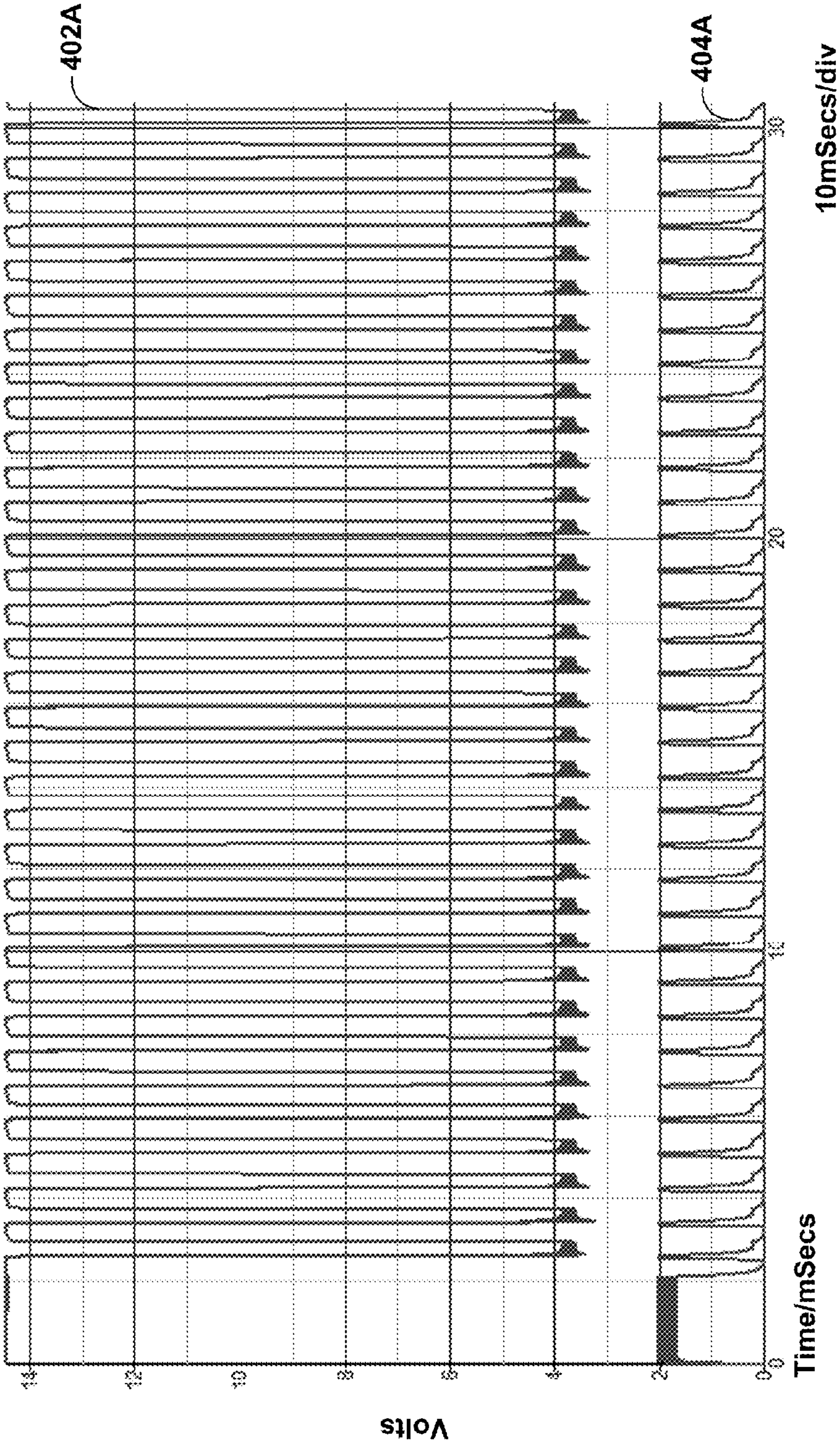
FIGS. 4A-4C are graphs illustrating example signals within a device that is configured to transmit and receive signals via a communication bus using a single isolation element, in accordance with one or more techniques of this disclosure.
Figure 4B:
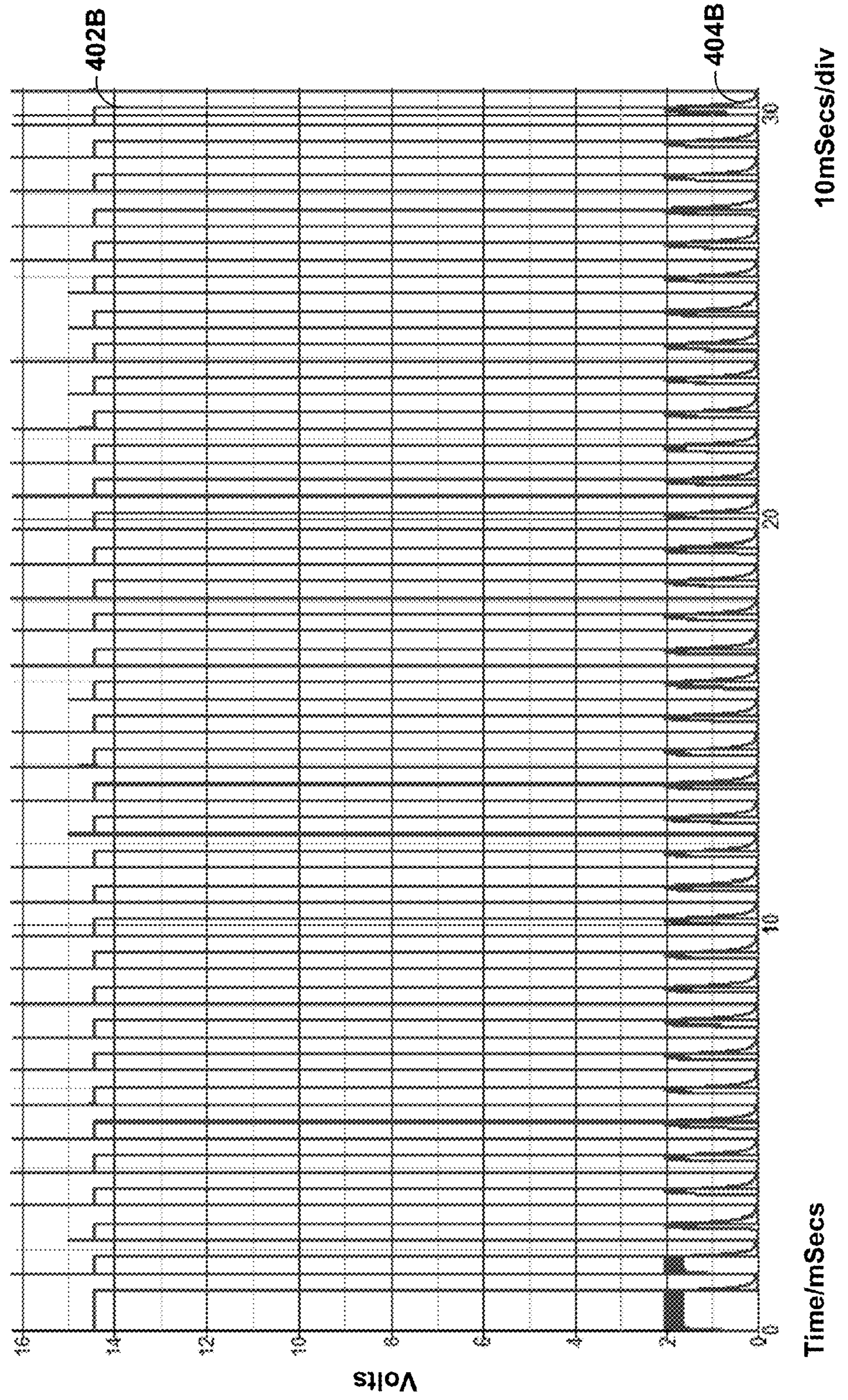
Figure 4C:
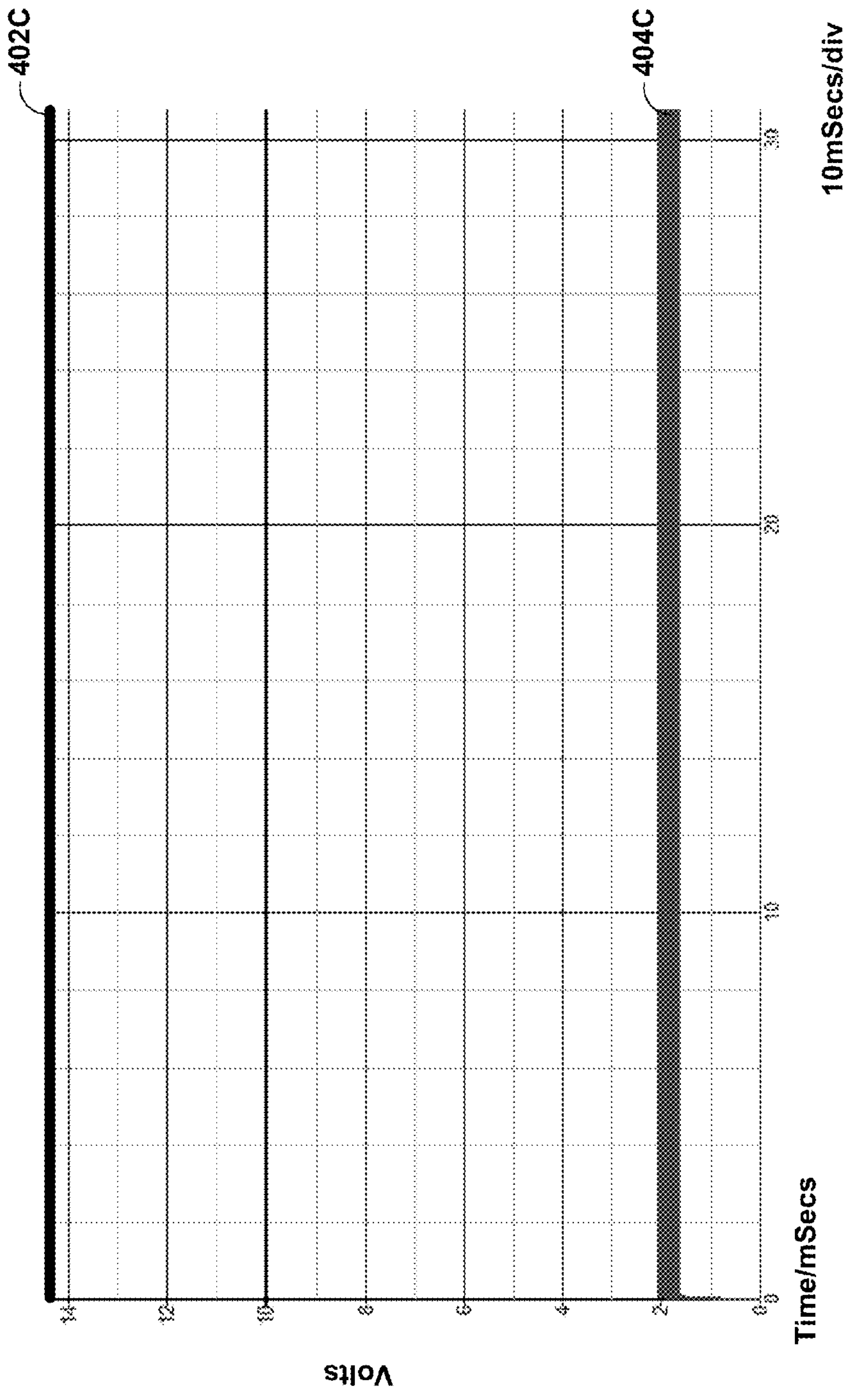

FIGS. 4A-4C are graphs illustrating example signals within a device that is configured to transmit and receive signals via a communication bus using a single isolation element, in accordance with one or more techniques of this disclosure. For purposes of illustration only, the example signals are described below within the context of device 6, device 6', and device 6" as respectively shown in FIGS. 1-3.

As discussed above, device 6 may operate in a plurality of communication states, such as transmit, digital receive, analog receive, and idle. FIGS. 4A-4C respective include plots 402A-402C (collectively, "plots 402") and 404A-404C (collectively, "plots 404") that illustrate signals within device 6 for each said communication states. In some examples, plots 402 may represent the voltage across two leads of a communication bus, such as first lead 11 and second lead 13 of communication bus 10 of FIG. 1; and plots 404 may represent the voltage signal received by an analog-to-digital converter, such as ADC 32 of FIG. 2 (i.e., the voltage across R4 and C1 of FIG. 3).

In some examples, plots 402A and 404A of FIG. 4A may correspond to signals within device 6 while device 6 is operating in the transmit communication state. As discussed above, to transmit signals via communication bus 10, transmitter 20 of device 6 may selectively lower the voltage across two leads of communication bus 10, such as first lead 11 and second lead 13 of communication bus 10 of FIG. 1. For instance, to transmit a first logical symbol (e.g., a logical "0"), signal generator 30 may output a signal at a first frequency (e.g., 200 kilohertz) to magnetize isolation element 16. Isolation element 16 may pass the signal and amplifier 34, which may be sensitive to signals at the first frequency, may amplify the signal such that CPD 36 activates switch 38 to lower the voltage drop between first lead 11 to second lead 13 to a first range (e.g., −6.5 volts to 6.5 volts). As illustrated by plot 402A, when activated by CPD 36 switch 38 may reduce the voltage drop between first lead 11 to second lead 13 to approximately 3.5 volts from approximately 14.5 volts. To transmit a second logical symbol, (e.g., a logical "1"), signal generator 30 may cease outputting the signal at the first frequency such that amplifier 34 causes CPD 36 to deactivate switch 38 to return the voltage drop between first lead 11 to second lead 13 to the voltage level supplied by communication bus 10 (e.g., the voltage level supplied by power supply 8 of FIG. 1, which may be between 9.5 volts and 22.5 volts). In this way, device 6 may transmit data while operating in the transmit communication state. As illustrated by plot 404A, the voltage levels at ADC 32 may correspond to the voltage levels at communication bus 10. In this way, controller 12 may receive feedback to, e.g., verify the transmitted data.

In some examples, plots 402B and 404B of FIG. 4B may correspond to signals within device 6 while device 6 is operating in the digital receive communication state. As discussed above, to receive signals via communication bus 10, signal generator 30 may output a signal at a second frequency (e.g., 50 kilohertz) to magnetize isolation element 16. The received digital data may be encoded in a plurality of symbols. As illustrated by plot 402B, on communication bus 10, a first symbol (e.g., a logical "0") may be represented by voltages between −6.5 volts and 6.5 volts, and a second symbol (e.g., a logical "1") may be represented by voltages between 9.5 volts and 22.5 volts. The signals may pass through signal conditioner 24, modulator 26, isolation element 16, and rectifier 28 before being read by ADC 32. As illustrated by plot 404B, the signals supplied to ADC 32 (e.g., by rectifier 28) may range from 0 volts to 2 volts with the first symbol (e.g., a logical "0") being represented by voltages greater than approximately 1.5 volts and the second symbol (e.g., a logical "1") being represented by voltages less than approximately 0.5 volts.

In some examples, plots 402C and 404C of FIG. 4C may correspond to signals within device 6 while device 6 is operating in the idle communication state. As discussed above, when in the idle communication state, device 6 may not receive or transmit signals via communication bus 10. In some examples, when operating the idle state, signal generator 30 may not output any signals that magnetize isolation element 16.

Figure 5A:
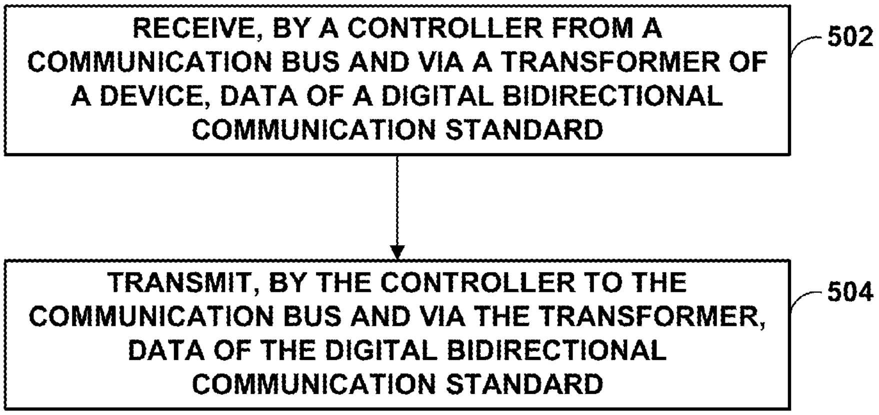
FIGS. 5A and 5B are flowcharts illustrating exemplary operations of a device that is configured to transmit and receive signals via a communication bus using a single isolation element, in accordance with one or more techniques of this disclosure.
Figure 5B:
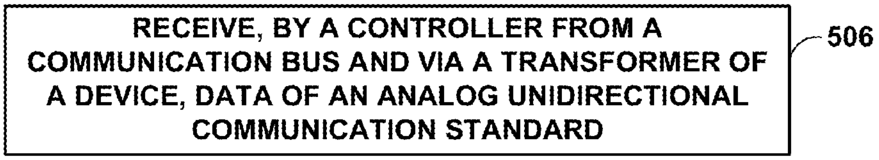

FIGS. 5A and 5B are flowcharts illustrating exemplary operations of a device that is configured to transmit and receive signals via a communication bus using a single isolation element, in accordance with one or more techniques of this disclosure. For purposes of illustration only, the example operations are described below within the context of device 6, device 6', and device 6" as respectively shown in FIGS. 1-3.

As discussed above, device 6 may be operable to communicate via a plurality of communication standards that include at least one analog unidirectional communication standard and at least one digital bidirectional communication standard. FIG. 5A illustrates exemplary operations of device 6 receiving and transmitting data using a digital bidirectional communication standard and FIG. 5B 5A illustrates exemplary operations of device 6 receiving data using an analog unidirectional communication standard. As discussed above, by having the flexibility to communicate via a plurality of communication standards using a single isolation element, device 6 may be compatible with a wider range of systems than devices operable to communicate using a single communication standard, and be less complex and/or less expensive that devices that use separate isolation elements for transmitting and receiving and/or different standards.

In some examples, to communicate using a digital bidirectional communication standard, controller 12 of device 6 may receive, from a communication bus and via a transformer of device 6, such as isolation element 16, data of the digital bidirectional communication standard (502). For instance, controller 12 may operate in a receive communication state in which signal generator 30 magnetizes isolation element 16 using a signal having a first frequency (or duty cycle) such that signals received from communication bus 10 may pass through isolation element 16 and be read by ADC 32.

Controller 12 may transmit, to the communication bus and via the transformer, data of the digital bidirectional communication standard (504). For instance, controller 12 may operate in a transmit communication state in which signal generator 30 magnetizes isolation element 16 using a signal having a second frequency (or duty cycle). In response to isolation element being magnetized at the second frequency (or duty cycle), one or more components of device 6, such as transmitter 20, may adjust a voltage level of communication bus 10.

In some examples, to communicate using an analog unidirectional communication standard, controller 12 of device 6 may receive, from a communication bus and via a transformer of device 6, such as isolation element 16, data of the analog unidirectional communication standard (506). For instance, controller 12 may operate in a receive communication state in which signal generator 30 magnetizes isolation element 16 using a signal having a first frequency (or duty cycle) such that signals received from communication bus 10 may pass through isolation element 16 and be read by ADC 32.

In either case (i.e., communicating using either standard), controller 12 may perform one or more actions based on the received data. For instance, controller 12 may activate (turn on), deactivate (turn off), dim (adjust brightness), change a color, and/or change a position (pitch, roll, yaw) of a lighting device, such as lighting device 18 of FIG. 1

The following numbered examples may illustrate one or more aspects of the disclosure:

Example 1

A device comprising: a transformer configured to electrically isolate one or more components of the device from a communication bus; and a controller configured to receive data and transmit data via the communication bus, wherein the controller is operable to communicate via a plurality of communication standards that include at least one analog unidirectional communication standard and at least one digital bidirectional communication standard, and wherein both the received data and the transmitted data pass through the transformer.

Example 2

The device of example 1, wherein the at least one analog unidirectional communication standard includes a 0-10 volt lighting control standard, and wherein the at least one digital bidirectional communication standard includes a digital addressable lighting interface (DALI) standard.

Example 3

The device of any combination of examples 1-2, wherein the device further comprises one or more signal generators configured to magnetize the transformer.

Example 4

The device of any combination of examples 1-3, wherein: to transmit data, the one or more signal generators magnetize the transformer at a first frequency, and to receive data, the one or more signal generators magnetize the transformer at a second frequency.

Example 5

The device of any combination of examples 1-4, wherein further comprising: one or more components electrically positioned between the transformer and the communication bus that are configured to adjust a voltage level of the communication bus in response to the transformer being magnetized at the first frequency.

Example 6

The device of any combination of examples 1-5, wherein: to transmit data, the one or more signal generators magnetize the transformer at a first duty cycle, and to receive data, the one or more signal generators magnetize the transformer at a second duty cycle.

Example 7

The device of any combination of examples 1-6, further comprising: one or more components electrically positioned between the transformer and the communication bus that are configured to adjust a voltage level of the communication bus in response to the transformer being magnetized at the first duty cycle.

Example 8

A method comprising: receiving, by a controller of a device from a communication bus and via a transformer of the device that is configured to electrically isolate one or more components of the device from a communication bus, data of a digital bidirectional communication standard; transmitting, by the controller to the communication bus and via the transformer, data of the digital bidirectional communication standard, wherein the controller is further configured to receive, from the communication bus and via the transformer, data of an analog unidirectional communication standard.

Example 9

The method of example 8, wherein the analog unidirectional communication standard includes a 0-10 volt lighting control standard, and wherein the digital bidirectional communication standard includes a digital addressable lighting interface (DALI) standard.

Example 10

The method of any combination of examples 8-9, wherein: transmitting further comprises magnetizing, by one or more signal generators of the device, the transformer at a first frequency; and receiving further comprises magnetizing, by the one or more signal generators of the device, the transformer at a second frequency.

Example 11

The method of any combination of examples 8-10, wherein transmitting further comprises: adjusting, by one or more components of the device electrically positioned between the transformer and the communication bus, a voltage level of the communication bus in response to the transformer being magnetized at the first frequency.

Example 12

The method of any combination of examples 8-11, wherein: transmitting further comprises magnetizing, by one or more signal generators of the device, the transformer at a first duty cycle; and receiving further comprises magnetizing, by the one or more signal generators of the device, the transformer at a second duty cycle.

Example 13

The method of any combination of examples 8-12, wherein transmitting further comprises: adjusting, by one or more components of the device electrically positioned between the transformer and the communication bus, a voltage level of the communication bus in response to the transformer being magnetized at the first duty cycle.

Example 14

A device comprising: means for electrically isolating one or more components of the device from a communication bus; and means for receiving data and transmitting data via the communication bus, wherein the means for receiving data and transmitting data are operable to communicate via a plurality of communication standards that include at least one analog unidirectional communication standard and at least one digital bidirectional communication standard, and wherein both the received data and the transmitted data pass through the means for electrically isolating.

Example 15

The device of example 14, wherein the at least one analog unidirectional communication standard includes a 0-10 volt lighting control standard, and wherein the at least one digital bidirectional communication standard includes a digital addressable lighting interface (DALI) standard.

Example 16

The device of any combination of examples 14-15, wherein: the means for receiving data and transmitting data comprise means for magnetizing the means for electrically isolating at a first frequency to transmit data, and the means for receiving data and transmitting data comprise means for magnetizing the means for electrically isolating at a second frequency to receive data.

Example 17

The device of any combination of examples 14-16, further comprising: means for adjusting a voltage level of the communication bus in response to the means for electrically isolating being magnetized at the first frequency, wherein the means for adjusting are electrically positioned between the means for electrically isolating and the communication bus.

Example 18

The device of any combination of examples 14-17, wherein: the means for receiving data and transmitting data comprise means for magnetizing the means for electrically isolating at a first duty cycle to transmit data, and the means for receiving data and transmitting data comprise means for magnetizing the means for electrically isolating at a second duty cycle to receive data.

Example 19

The device of any combination of examples 14-18, further comprising: means for adjusting a voltage level of the communication bus in response to the means for electrically isolating being magnetized at the first duty cycle, wherein the means for adjusting are electrically positioned between the means for electrically isolating and the communication bus.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A device comprising:

a transformer configured to electrically isolate one or more components of the device from a communication bus; and a controller configured to receive data and transmit data via the communication bus, wherein the controller is operable to communicate via a plurality of communication standards that include at least one analog unidirectional communication standard and at least one digital bidirectional communication standard, and wherein both the received data and the transmitted data pass through the transformer.

2. The device of claim 1, wherein the at least one analog unidirectional communication standard includes a 0-10 volt lighting control standard, and wherein the at least one digital bidirectional communication standard includes a digital addressable lighting interface (DALI) standard.

3. The device of claim 1, wherein the controller comprises one or more signal generators configured to magnetize the transformer.

4. The device of claim 3, wherein:

to transmit data, the one or more signal generators magnetize the transformer at a first frequency, and to receive data, the one or more signal generators magnetize the transformer at a second frequency.

5. The device of claim 4, wherein further comprising:

one or more components electrically positioned between the transformer and the communication bus that are configured to adjust a voltage level of the communication bus in response to the transformer being magnetized at the first frequency.

6. The device of claim 3, wherein:

to transmit data, the one or more signal generators magnetize the transformer at a first duty cycle, and to receive data, the one or more signal generators magnetize the transformer at a second duty cycle.

7. The device of claim 6, further comprising:

one or more components electrically positioned between the transformer and the communication bus that are configured to adjust a voltage level of the communication bus in response to the transformer being magnetized at the first duty cycle.

8. A method comprising:

receiving, by a controller of a device from a communication bus and via a transformer of the device that is configured to electrically isolate one or more components of the device from a communication bus, data of a digital bidirectional communication standard; and transmitting, by the controller to the communication bus and via the transformer, data of the digital bidirectional communication standard, wherein the controller is further configured to receive, from the communication bus and via the transformer, data of an analog unidirectional communication standard.

9. The method of claim 8, wherein the analog unidirectional communication standard includes a 0-10 volt lighting control standard, and wherein the digital bidirectional communication standard includes a digital addressable lighting interface (DALI) standard.

10. The method of claim 8, wherein:

transmitting further comprises magnetizing, by one or more signal generators of the controller, the transformer at a first frequency; and receiving further comprises magnetizing, by the one or more signal generators, the transformer at a second frequency.

11. The method of claim 10, wherein transmitting further comprises:

adjusting, by one or more components of the device electrically positioned between the transformer and the communication bus, a voltage level of the communication bus in response to the transformer being magnetized at the first frequency.

12. The method of claim 8, wherein:

transmitting further comprises magnetizing, by one or more signal generators of the device, the transformer at a first duty cycle; and receiving further comprises magnetizing, by the one or more signal generators of the device, the transformer at a second duty cycle.

13. The method of claim 12, wherein transmitting further comprises:

adjusting, by one or more components of the device electrically positioned between the transformer and the communication bus, a voltage level of the communication bus in response to the transformer being magnetized at the first duty cycle.

14. A device comprising:

means for electrically isolating one or more components of the device from a communication bus; and means for receiving data and transmitting data via the communication bus, wherein the means for receiving data and transmitting data are operable to communicate via a plurality of communication standards that include at least one analog unidirectional communication standard and at least one digital bidirectional communication standard, and wherein both the received data and the transmitted data pass through the means for electrically isolating.

15. The device of claim 14, wherein the at least one analog unidirectional communication standard includes a 0-10 volt lighting control standard, and wherein the at least one digital bidirectional communication standard includes a digital addressable lighting interface (DALI) standard.

16. The device of claim 14, wherein:

the means for receiving data and transmitting data comprise means for magnetizing the means for electrically isolating at a first frequency to transmit data, and the means for receiving data and transmitting data comprise means for magnetizing the means for electrically isolating at a second frequency to receive data.

17. The device of claim 16, further comprising:

means for adjusting a voltage level of the communication bus in response to the means for electrically isolating being magnetized at the first frequency, wherein the means for adjusting are electrically positioned between the means for electrically isolating and the communication bus.

18. The device of claim 14, wherein:

the means for receiving data and transmitting data comprise means for magnetizing the means for electrically isolating at a first duty cycle to transmit data, and the means for receiving data and transmitting data comprise means for magnetizing the means for electrically isolating at a second duty cycle to receive data.

19. The device of claim 18, further comprising:

means for adjusting a voltage level of the communication bus in response to the means for electrically isolating being magnetized at the first duty cycle, wherein the means for adjusting are electrically positioned between the means for electrically isolating and the communication bus.

* * * * *